Sept. 4, 1923.
A. SHARPE
1,467,200
MASTER TEMPLATE FOR GASKETS
Filed Nov. 2, 1920
2 Sheets-Sheet 2
Fig. 2.
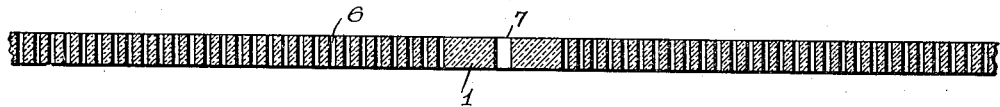
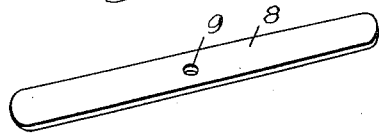
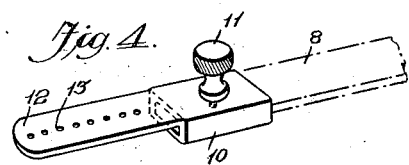
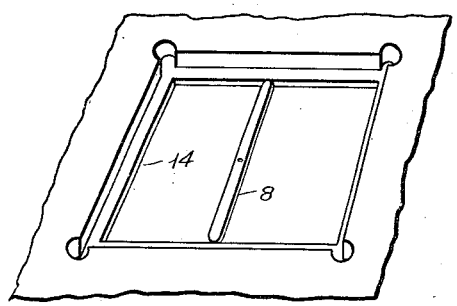
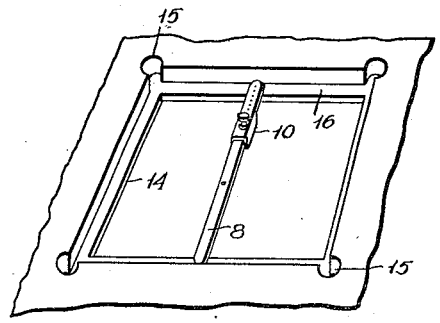
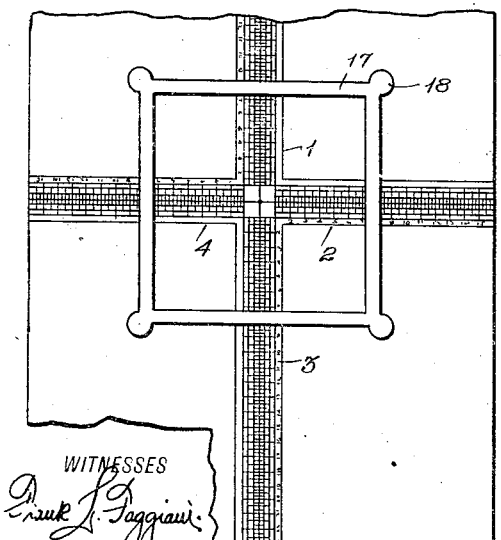
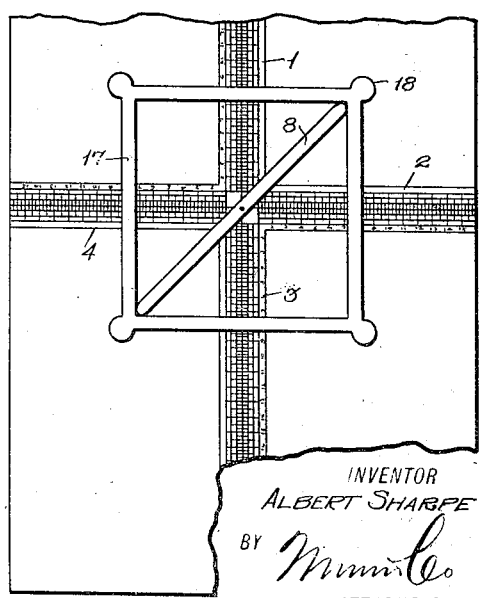
WITNESSES
INVENTOR
ALBERT SHARPE
BY
ATTORNEYS Patented Sept. 4, 1923.

1,467,200

UNITED STATES PATENT OFFICE.

ALBERT SHARPE, OF BROOKLYN, NEW YORK.

MASTER TEMPLATE FOR GASKETS.

Application filed November 2, 1920. Serial No. 421,224.

*To all whom it may concern:*

Be it known that I, ALBERT SHARPE, a citizen of the United States, and a resident of the city of New York, borough of Brooklyn, in the county of Kings and State of New York, have invented a new and Improved Master Template for Gaskets, of which the following is a full, clear, and exact description.

This invention relates to templates for measuring devices, and has for an object the provision of a measuring device whereby ready measurements may be made of irregular formations, such as gasket patterns, etc.

Another object of the invention resides in the provision of means whereby if the desired dimensions of a form are given they may be laid out readily and simply in a much more efficient manner than hitherto.

A further object of the invention resides in the provision of a combination of devices whereby the dimensions of irregular apertures in pipes or other passages may be measured and the variation from the required dimensions of gaskets to fit in said apertures may be readily determined.

A still further object resides in the particular construction and arrangement of parts hereinafter described and claimed and shown in the accompanying drawings.

In general, my invention comprises a template having a plurality of graduated arms extending from its common center which can be laid out on a surface, and is provided throughout its length with a plurality of definitely spaced apertures through which markings can be made on the pattern or other surface beneath. In combination with this template, I provide a plurality of measuring devices or gages of various sizes which can be centrally positioned with respect to the template so as to mark off on the pattern points which lie off the template.

Another feature of my invention concerns the use of the gages and the template to determine the variation of gaskets from standard dimensions desired. A further object of my invention resides in the simplicity of structure and operation of this device whereby the articles to be measured can be readily applied to the template and its co-operating devices.

The invention is illustrated in the drawings, of which—

Figure 2 is a vertical longitudinal section through the template;

Figure 3 is a perspective view of one of the gages;

Figure 4 is a perspective view of an extension attachment for one of the gages;

Figure 5 is a perspective view of an aperture adapted to be measured by the gages;

Figure 6 is a perspective view of a similar aperture showing the use of the extension attachment;

Figure 7 is a view illustrating the manner of measuring the dimensions of the gasket; and Figure 8 is a plan view showing the way in which the off-center dimensions of the gasket may be made by use of the gage in combination with the template.

Figure 1:
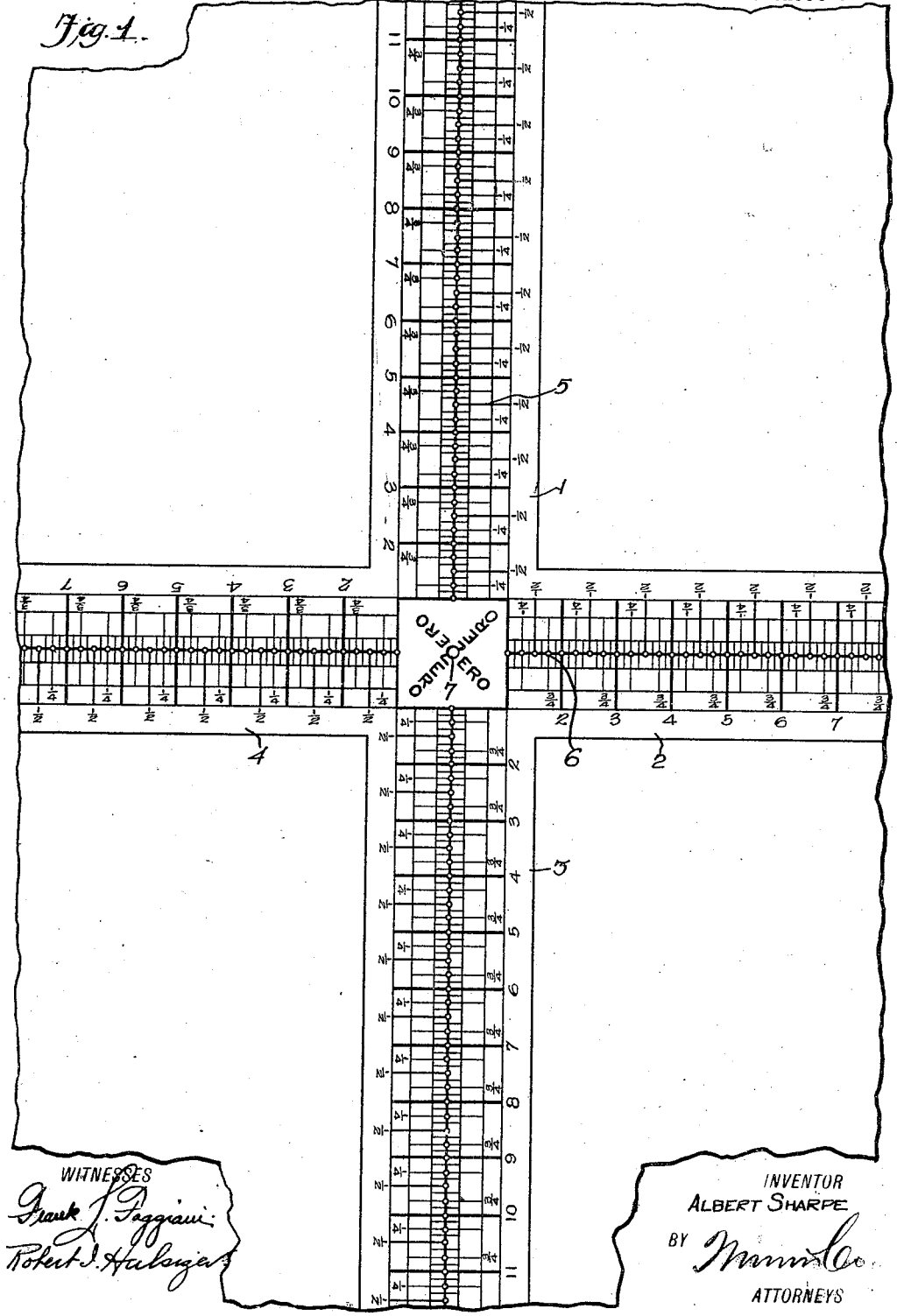
Figure 1 is a partial plan view of the template.

The invention comprises a template having a body portion with oppositely extending arms 1, 2, 3 and 4 but is preferably made of some thin transparent material, such as celluloid. Each of the arms is provided throughout its length with a plurality of graduations 5 which are of any desired character and, as shown, are marked off in dimensions as small as one-eighth of an inch. Down the center line of each arm a plurality of apertures or perforations 6 are disposed, as shown they are a quarter of an inch apart. This provides means whereby a pin or other marker may be inserted through the aperture to make a mark on the pattern beneath the template. The common center of the arms 1, 2, 3 and 4 is provided with an aperture 7 by means of which the template can be centered. This aperture 7, also, is disposed at the center of the graduated scale on each arm.

In Figure 3 is illustrated a gage 8 made of some thin, flat metallic substance, such as steel, provided with a central aperture 9. In the operation of my template and in co-operation therewith I may use any number of these gages 8, each one being of a standard length.

In Figure 4 is shown a sleeve portion 10 provided with an adjusting screw 11 and having an integrally extended portion 12 provided throughout its length with a plurality of apertures 13. This extension device is provided to extend the length of any one of the gages 8 to which it may be attached.

As shown in Figure 5, it may be desirous to determine the dimensions of an aperture such as 14, which may be an aperture in a steam line, or any other aperture. Having a set of gages of various standard lengths, one is selected which, as shown in Figure 5, exactly fits one dimension of the aperture.

As shown in Figure 6, the width of the flange 16 in this aperture may be measured by placing the extension on the gage 8 and noting the width of the flange by comparison with the apertures in the extended portion 12, since these apertures 13 are spaced a definite distance apart. If it is desired to measure the distance across the aperture between points such as 15, which are irregular portions of the aperture, a suitable gage is selected which fits between these two points, and noting the dimension of this gage we have the dimension required.

Having determined the various required dimensions of the aperture, these are listed. Gaskets which may be required to fit in these apertures are supposed to be made in standard sizes in accordance with the standard sizes of apertures used in steam-pipe lines and other mechanical systems where gaskets are used, but since gaskets are made of such material as asbestos and become warped in time, they are not always of the standard dimensions. To determine their variation from the required standard dimensions, each gasket, such as 17, is placed on the template as shown in Figure 7 and the variation of its rectilinear dimensions from the desired dimensions can be noted to determine whether the gasket comes within the desired degree of being of a proper size. Gaskets are usually ordered by stock number from a catalogue which gives the assumed dimensions of the gasket for that stock number. In order to determine the variation from standard of the corner portions 18 of the gaskets, as shown in Figure 8, I select the gage which was used in determining the dimensions of the aperture across this line and register the aperture 9 of the gage with the aperture 7 in the template and then swing the gage until it is in line with the direction of the line to be measured. It can be readily determined by inspection whether the end of the gage which is of the proper dimension coincides with the proper point on the gasket.

It will also be readily apparent that I can use this template and these gages for laying out many sorts of patterns on different material, such as leather or paper or cloth, and that this combination of devices provides a simple and efficient means for laying out patterns. Various modifications can, of course, be made in the parts of this device without departing from the spirit of the invention.

What I claim is:

1. The combination with a template for making patterns having a plurality of graduated arms extending from a common center and provided on each arm with a plurality of definitely spaced apertures, of a gage having a predetermined linear dimension and an aperture centrally located therein adapted to be disposed in registration with the common center of the template whereby the ends of the gage can be swung to mark a point on the pattern off the line of the arms of the template.

2. The combination with a template having a plurality of arms extending from a common center, of a gage having a definite linear dimension, said gage adapted to be disposed in registration with the common center of the template arms whereby the ends of the gage can be swung to mark a point on a pattern off the lines of the arms of the template.

3. An extension device for gages, which comprises a sleeve fitting over the end of the gage, means for holding the sleeve in an adjusted position on the end of the gage, and an extension on the sleeve extending beyond the end of the gage and provided with linear markings thereon.

ALBERT SHARPE.